Oct. 9, 1945.    W. R. McELMURRAY    2,386,703
STARTING DEVICE FOR OUTBOARD MOTORS
Filed July 21, 1943    2 Sheets-Sheet 1

INVENTOR.
William R. McElmurray,
BY Miller & Miller
ATTORNEYS.

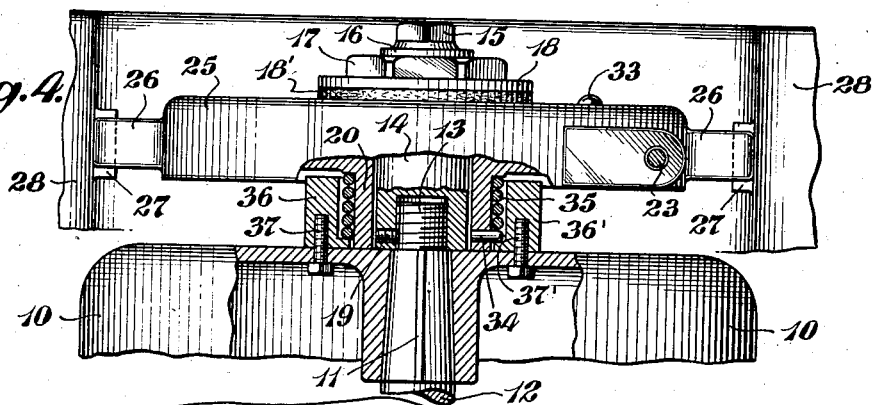
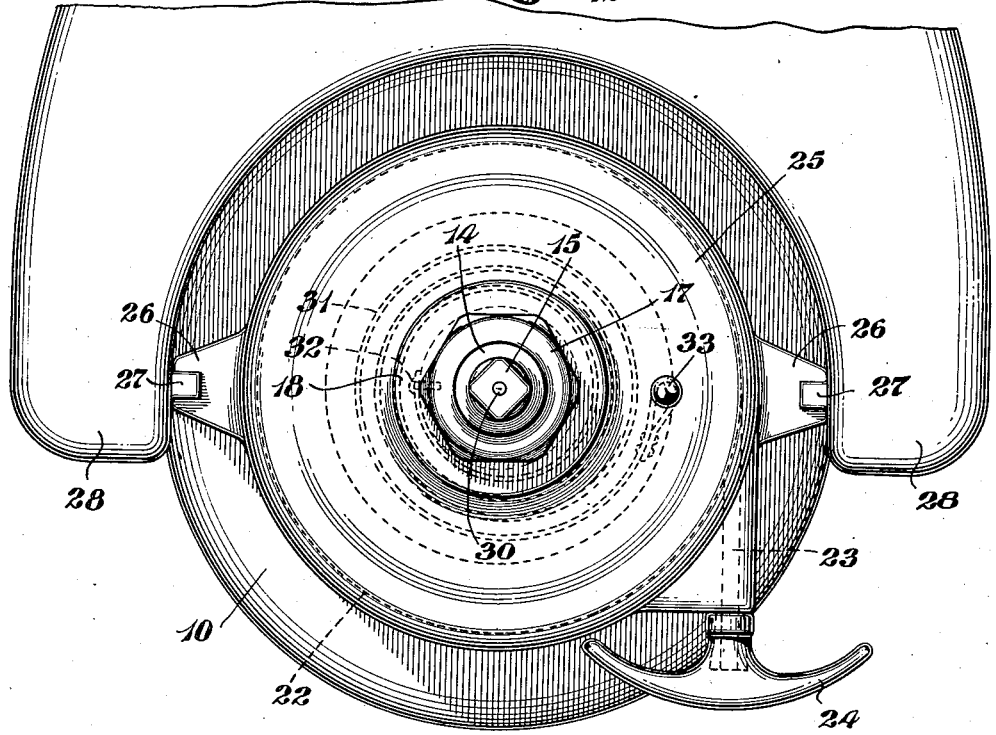

Patented Oct. 9, 1945

2,386,703

UNITED STATES PATENT OFFICE 2,386,703

STARTING DEVICE FOR OUTBOARD MOTORS

William R. McElmurray, Frankfort, Ky.

Application July 21, 1943, Serial No. 495,665

1 Claim. (Cl. 123—185)

This invention relates to a starting device for outboard motors and other similar small internal combustion engines wherein it is necessary to initially rotate the motor in order to cause it to start, usually by pulling a rope or cable which is in some way wrapped around the flywheel so as to give it its initial rotation by pulling the rope.

An object of this invention is to so mount this pulling rope or cable that it will always be in operative position ready for use whenever the motor is not running, and which is automatically restored to operative position as soon as it has been released, whether the motor has "caught" and commenced operating or not.

A further object of this invention is to provide a clutch mechanism between the rope and the flywheel so that a pull on the rope causes the clutch to engage the flywheel and rotate it, and to also include a rope rewinding mechanism which rewinds the rope to operative position as soon as the clutch mechanism is disengaged by releasing the rope, thus restoring the rope to operative position, ready for a second pull on the flywheel should the motor have failed to start, or ready for starting the motor the next time after it has been allowed to stop.

A further object of this invention is to provide a clutch mechanism in a motor starting device which clutch mechanism automatically disengages itself as soon as the pull on the rope is discontinued, whether the motor has started to operate or not.

Still a further object of this invention is to provide a clutch mechanism which in one form, a clutch collar is connected to the flywheel by a clutch spring and centrifugally disengageable connecting means, and in another form the clutch collar is attached to the flywheel and the clutch spring alone disengages therefrom.

With the foregoing and other objects in view as will hereinafter become apparent, this invention includes the combinations, constructions, and arrangements of parts hereinafter set forth, disclosed, and illustrated on the accompanying drawings, wherein—

Fig. 3 is a top plan view of starting device mounted on a motor, and

Fig. 4 is a view similar to Fig. 1, showing a modified form of clutch mechanism.

Figure 1:
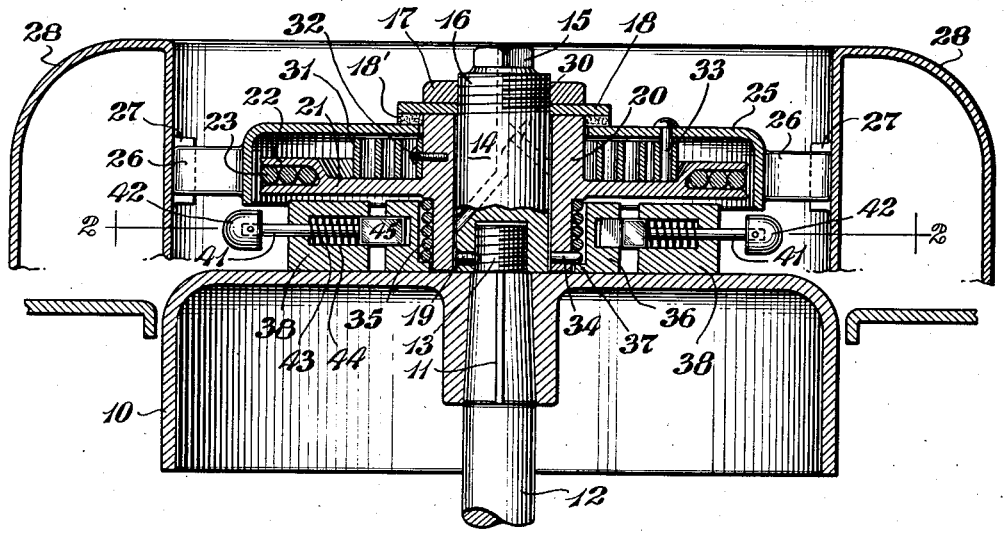
Figure 1 is a sectional view through the starting device of this invention to the flywheel of a motor.

There is shown at 10 a flywheel keyed at 11 to a shaft 12 of the motor to which the starting device of this invention is connected for starting purposes. The shaft 12 ends in a thread 13, usually for receiving a nut for holding the flywheel in place thereon. This nut is omitted, and instead, an extension shaft 14 having a cooperating female thread is secured on the shaft thread 13 and locked thereon by a set screw 19. This extension shaft has a squared end 15 for receiving a wrench in attaching it to the motor shaft 12, and is threaded as at 16 near its end for receiving a nut 17 for holding a washer 18 and a grease ring 18' over a hub 20. A grease or oil channel 30 is provided in the extension shaft 14 for providing lubrication between the surface of the extension shaft 14 and the inside of the hub 20.

This hub 20 is shaped substantially as shown, being provided with an annulus 21 which near its periphery, is bifurcated to provide a rope receiving channel 22. A rope 23 is secured in this channel 22 at one end and is wrapped around within the channel 22 and terminates in a handle 24 extending through a housing 25. This housing 25 is provided with a pair of lugs 26 cooperating with stops 27 extending from a gasoline tank 28. A spiral spring 31 is secured at one end 32 to the hub 20 and is secured at its other end 33 to the housing 25. The spring 31 spirals in such a direction that it is placed under increasing tension when the rope 23 is pulled, and hence when the rope 23 is released, the tension in spring 31 rewinds the rope 23 back into its channel 22.

Fastened to the hub 20 below the annulus 21 as at one end 34, is a clutch coil spring 35, while surrounding this clutch coil spring 35 is a clutch collar 36 provided with an internally extending flange 37. The other end of the clutch coil spring 35 is unattached, and this coil spring 35 is wound in such a direction that when the hub 20 is rotated by pulling rope 23, the coil spring 35 expands into contact with the inner surface of clutch collar 36, and causes the clutch collar 36 to rotate with the hub 20. As thus far described, the parts in both forms are identical, and the same reference numerals apply to both forms.

Figure 2:
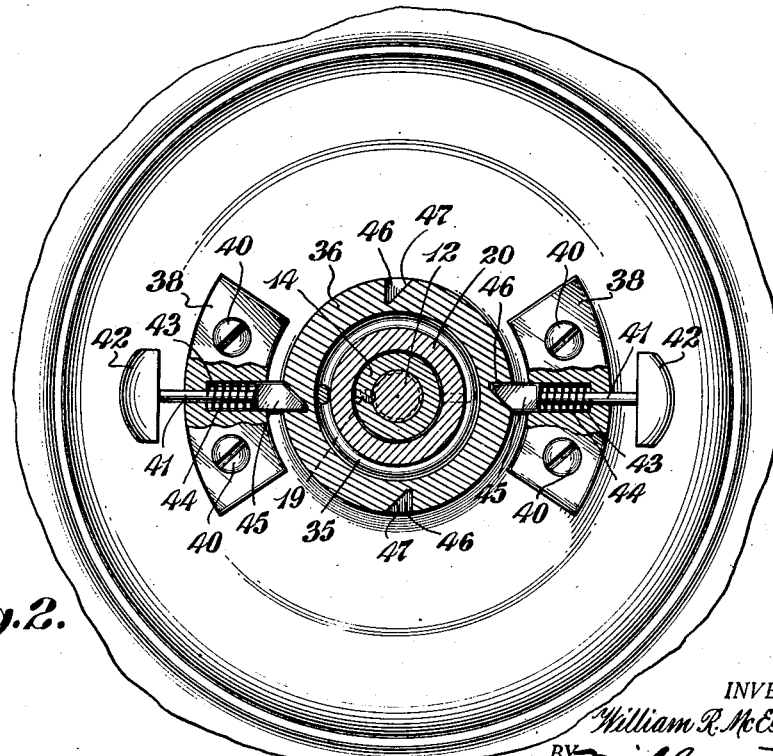
Fig. 2 is a sectional view on line 2—2 of Fig. 1.

In Fig. 4, the clutch collar 36' is secured, as by stud screws 37', to the flywheel 10, thus rotating the flywheel 10 directly. In Figs. 1 and 2, however, the clutch collar 36 is not directly connected to the flywheel 10, but instead, two, or more, equally spaced lugs 38 are secured to the flywheel 10 around the clutch collar 36 as by screws 40. Extending through the lugs 38 are pins 41 having weighted heads 42 tending to draw them outwardly under centrifugal force when the flywheel is rotating, while small springs 43 in counterbores 44 in lugs 38 pushing against the teeth 45 on the pins 41, pull the pins inwardly, when the motor is not rotating, causing the teeth 45 to engage within the correspondingly shaped recesses 46 in the clutch collar 26. It will be noted that the teeth 45 and recesses 46 are so shaped that when the force is exerted from the clutch collar 36 to the teeth 45, the teeth tend to stay in engagement within the recesses, but when the motor starts and overruns the clutch collar, the bevels 47 tend to push out the teeth 45, thus assisting centrifugal force in disengaging the teeth and preventing any accidental jamming of the pin teeth and the clutch collar. In addition, the clutch collar tends to disengage from the coil clutch spring 35, thus absolutely insuring that starting device will be disengaged, and that there will be a minimum of friction and noise resulting therefrom, thereby providing a silent, free-running and smoothly operating device.

While the device has been shown and the structure described in detail, it is obvious that this invention is not to be considered limited to the exact form disclosed, and that changes may be made therein within the scope of what is claimed without departing from the spirit of the invention.

Having thus set forth and disclosed the nature of this invention, what is claimed is:

A rope pull starting attachment for an internal combustion engine of the outboard motor type comprising an extension shaft adapted to be secured on an end of the engine, a hub journaled on said extension shaft, a rope pulley integral with said hub, a rope wound on said pulley, one end of said rope being secured to said pulley, a spiral spring, one end of said spiral spring being secured to said pulley, means for anchoring the other end of said spiral spring, said spring being tensioned to permit said pulley to rotate a limited amount when said rope is pulled but rewinding said rope when the pull on said rope is released, a clutch ring secured to said pulley, a clutch collar concentric with said clutch ring, means for clutching said collar to said ring, a rotatable engine part and an overrunning clutch mechanism including said collar, connected to said rotatable engine part for causing it to rotate when the rope is pulled and permitting it to overrun the said collar and rotate under power from the engine.

WILLIAM R. McELMURRAY.